3,691,021
PROCESS FOR PURIFICATION OF VINYL
ACETATE BY EXTRACTIVE DISTILLATION
Julian Feldman, Frank Lerman, and Franklyn D. Miller, Cincinnati, Ohio, assignors to National Distillers and Chemical Corporation, New York, N.Y.
Filed Mar. 26, 1970, Ser. No. 22,960
Int. Cl. C07c 67/06; B01d 3/40
U.S. Cl. 203—65                                   10 Claims

ABSTRACT OF THE DISCLOSURE

A process for purification of vinyl acetate containing residual but appreciable amounts of ethyl acetate which process is particularly adapted for separation and removal of the ethyl acetate therefrom by subjecting an impure, crude stream of vinyl acetate containing ethyl acetate and other impurities to extractive distillation using an aromatic hydroxy compound and more particularly, phenol, as the extractive solvent; a special feature being critical control of temperatures at the lower portion of the extractive distillation tower.

---

Figure 1:
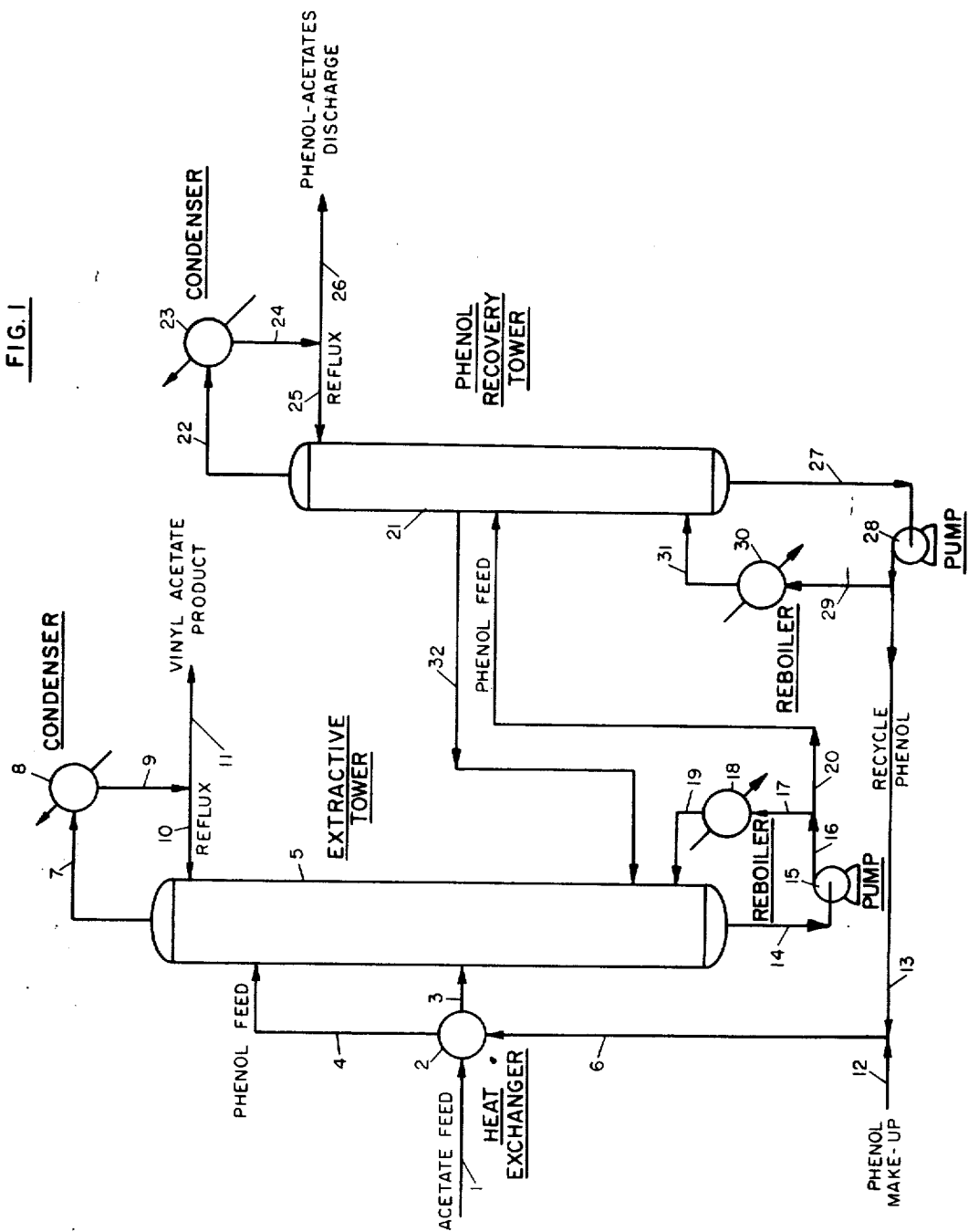

This invention relates broadly to a purification process for crude vinyl acetate by extractive distillation of ethyl acetate therefrom using aromatic hydroxy compounds as extractive distillation agents. More particularly, the invention pertains to purification of a crude vinyl acetate stream by an improved extractive distillation process using phenol as the extractive solvent with critical control of temperatures at the bottom of the extractive distillation tower.

One object of this invention is to provide an improved extractive distillation process for purification of vinyl acetate from ethyl acetate by utilizing aromatic hydroxy compounds for extractive distillation.

Another object of this invention is to produce vinyl acetate having not more than about 100 parts per million of ethyl acetate therein.

A further object of this invention is to employ phenol as the extractive distillation solvent to purify crude vinyl acetate from ethyl acetate and control both the temperature and vinyl acetate concentration in the bottom of the extractive distillation column.

These and other objects will be apparent from the detailed description of the invention set forth below.

Among the production problems connected with processes for manufacturing vinyl acetate on a commercial scale is the purification of the crude vinyl acetate, particularly reducing the amount of ethyl acetate in the crude product vinyl acetate to a few parts per million by weight such as required for its use in polymers. For instance, in processes for making vinyl acetate via catalytic reaction of ethylene, oxygen and acetic acid passed into contact with palladium or palladium-containing catalyst, the crude vinyl acetate product contains appreciable amounts of ethyl acetate which preferably should be substantially removed prior to use of the vinyl acetate as a monomer in polymerization or copolymerizations to vinyl polymers. Such a vinyl acetate synthesis process is described in U.S. Pat. No. 3,190,912; and the crude vinyl acetate product obtained therefrom has been found to contain up to 5000 p.p.m. ethyl acetate and generally from about 500 to 2500 p.p.m. of ethyl acetate.

The particular separation of vinyl acetate and ethyl acetate is a difficult problem because some specifications for polymerization call for a maximum ethyl acetate content of 100 parts per million and preferably 50 parts per million. Such a low level of impurity is not easy to achieve by regular distillation even when the bulk of the components are readily separable and is even a greater challenge since the relative volatility of the components approaches unity (values of relative volatility for vinyl acetate to ethyl acetate lie between 1.1 and 1.2). For systems of similar substances such as aliphatic esters in this case, the relative volatility is a function of the difference in boiling points (77.15° C. for ethyl acetate and 72.5° C. for vinyl acetate).

Among the methods which have been attempted, conventional fractional distillation has been used. However, in order to obtain the effective separation and purification necessary to reduce the amount of ethyl acetate in the vinyl acetate to the desired low level, more than one hundred theoretical trays in the distillation tower equipment is required. As the result of the difficulties thus encountered, the extractive distillation technique was studied. To facilitate the separation, it is necessary to find a solvent of suitable characteristics such that the solvent alters the partial vapor pressures of the liquids to be separated; i.e., the relative volatility of the two liquids are shifted to a value appreciably different from unity. Fewer distillation tower trays and lower reflux ratios are then required to effect the purification by extractive distillation.

The concentration of ethyl acetate in vinyl acetate made from ethylene by known catalytic processes may vary from about 500 to 2500 p.p.m. (0.25%) by weight or higher. Other impurities may be present in varying amounts.

It is most desirable to purify such a crude vinyl acetate to a product having an ethyl acetate content not more than 100 p.p.m. and preferably to an appreciably lower ethyl acetate content. One problem occurring on both industrial and smaller scale operations is the separation of appreciable amounts of ethyl acetate, of up to 50% and even higher concentrations, from vinyl acetate. Here also, the small difference in boiling points and the low volatilities makes separation of ethyl acetate from vinyl acetate difficult.

In either case, a practical solution is a separation or purification by an extractive distillation process. It is best to use an extraction solvent which affords a relative volatility of at least about 1.5 between vinyl acetate and ethyl acetate at the concentration and operating conditions for distillation. For commercial operation, in addition to an extractive distillation tower for separating or purifying acetates, a solvent recovery tower is also necessary to substantially remove the acetates from the solvent before the solvent is recycled for re-use in the extractive distillation tower.

It has now been found that by the use of a selective extractive distillation process it is possible to purify vinyl acetate by reducing the amount of ethyl acetate to the desired low levels. The extractive solvent employed is an aromatic hydroxy compound such as phenol, ortho-, meta-, or paracresol, any of the various xylenols, the naphthols and mixtures thereof. Phenol and mixtures of phenol with cresols are the preferred extractive solvent.

It has additionally been discovered that unexpected and highly desirable advantages can be obtained in the extractive distillation process by recycling to the bottom section of the distillation column a portion of the ethyl acetate-containing aromatic hydroxy compound stream recovered from the distillation column. Under ordinary extractive distillation conditions, if the heating is prolonged and the bottom temperatures exceed about 160° C., transesterification between vinyl acetate and phenol will occur producing acetaldehyde and phenyl acetate. Problems arise from the necessity of employing special separation and purification treatments. Accordingly, an important feature of this invention resides in the discovery that undesirable side reactions and by-product formation can be minimized during extractive distillation by recycling ethyl acetate into the bottom portion of the distillation column.

In addition to the unexpected advantage of good relative volatilities for the acetates, extractive distillation using the aromatic hydroxy compounds has been found to have other important advantages. Phenol is an effective inhibitor of vinyl acetate polymerization. Therefore, as an added feature at the high phenol concentrations used throughout most of the modified extractive distillation operations, the formation of appreciable amounts of polyvinyl acetate is not encountered. This results in reduced maintenance and greater efficiency for the distillation column. The use of inhibitors, such as hydroquinone, during the purification of vinyl acetate can also be avoided or substantially reduced. Furthermore, the presence of phenol permits vinyl acetate to be stored for longer periods without risk of polymerization.

Although it might be expected that traces of phenol (10 p.p.m.) which might be present in the vinyl acetate product would interfere with commercial polymerization processes, tests have shown that this does not occur. Copolymerization runs made on vinyl acetate containing 10 and 100 p.p.m. phenol show no noticeable differences when compared to phenol-free vinyl acetate copolymerization in either successful polymerization or the quality of products obtained.

Another unexpected advantage is that phenol will suspend or dissolve certain polymers and other high-boiling impurities in the extractive or recovery towers, thus helping keep the trays clean and unclogged for more efficient distillation operations. Such impurities are readily removed from the phenol by conventional means to maintain recycle solvent purity.

There are a number of unexpected advantages obtained by the practice of this invention. One of the most important is that the separation and purification step contemplated by the process of the invention can be achieved without appreciable polymerization of the vinyl acetate. A vinyl acetate product of high purity having 50–100 parts per million of ethyl acetate or less can be produced using this purification step.

Also the use of aromatic hydroxy compounds as the solvent in the extractive distillation gives increased recovery of vinyl acetate and reduces investment and manufacturing costs as compared with other separation or purification methods such as ordinary fractional distillation.

To describe the inventive process in greater detail, it has been found that the aromatic hydroxy compounds function as extractive solvents to increase the relative volatility of vinyl acetate over ethyl acetate in liquid solution mixtures. The increase is a function of the component concentrations and the temperature. Without an extractive solvent, solutions of vinyl acetate and ethyl acetate have relative volatilities of 1.1 to 1.2 at atmospheric boiling temperatures of about 70 to 78° C. When the acetates are dissolved in phenol, the relative volatilities of vinyl to ethyl acetate increase to about 1.3 at 20% phenol to about 2.3 at 90% phenol concentrations at the atmospheric boiling temperatures of about 85 to 160° C., respectively.

At below atmospheric boiling temperatures, the relative volatilities are higher. Thus, for a solution at 90% phenol concentration at a temperature of say 72° C., appreciably below its atmospheric boiling temperature, the relative volatilities of vinyl acetate to ethyl acetate would be approximately 3. Distilling such high phenol concentration solutions at these lower temperatures requires vacuum operation not usually practical in commercial production.

Under comparative concentrations and operating conditions, cresols and xylenols and their mixtures with phenol give, in general, lower relative volatilities for vinyl acetate to ethyl acetate than when phenol alone is used as the extractive solvent.

The preferred extractive solvent is phenol, issued in weight concentrations of from about 20% to 90%, and preferably from 30 to 75%, based on the weight of the vinyl acetate feed, in liquid mixtures with acetates for separation and purification by extractive distillation.

From the practical, operational viewpoint, in order to carry out the purification in the preferred manner with lower temperatures and an appropriate concentration of acetate in the bottom section of the extractive distillation tower, it is preferred to employ a recycle step by removing at least part of the bottoms, passing the stream through a reheater or heat exchanger and returning it. In general, the temperature in the bottom section of the distillation column should not exceed about 160° C., and preferably be within the range of about 120° to 140° C. The ethyl acetate concentration is generally within the range of about 30 to 60% by weight. Lower temperatures in the bottoms of the distillation column can also be achieved by vacuum, although the cost of vacuum distillation may be an economic deterrent.

The invention will be illustrated in greater detail by the more specific examples and embodiment presented hereinbelow.

EXAMPLE 1

(A) In order to establish the influence of the aromatic hydroxy compounds on the relative volatility of ethyl acetate-vinyl acetate, a simple equilibrium type study was employed. A mixture of the selected solvent, vinyl acetate, and ethyl acetate of a given composition (usually 90%–5%–5% by volume) was placed in a 25 ml. Erlenmeyer flask, and stoppered with a serum cap. The flask was submerged in a beaker of water heated by a hot plate. The mixture was allowed to come to equilibrium at a fixed temperature, for example, 72° C. or higher.

After about 10 minutes, a sample of the vapor was removed with a gas-tight syringe. The sample was immediately introduced into the injection port of a gas-liquid chromatograph capable of resolving the mixture of the two acetate esters. Then a sample of the liquid was removed from the flask by introducing the needle of an ordinary 10 microliter syringe through the serum cap and into the liquid. This sample was also analyzed in the gas-liquid chromatograph.

The relative amounts of the two esters in each sample was assumed proportional to the areas of their characteristic curves as measured by a disc integrator attached to the recording potentiometer of the chromatograph. The ratio of the concentration of vinyl acetate to ethyl acetate in the gas phase as well as in the liquid phase of the equilibrium mixtures could therefore be determined.

The ratio of vinyl acetate to ethyl acetate in the vapor phase divided by the corresponding ratio in the liquid phase gives the relative volatility. The effectiveness of the selected solvents is determined by the degree of deviation of the relative volatility from unity. The aromatic hydroxy compounds when used as solvents gave to the acetate mixture greater deviation in relative volatility from unity than the corresponding acetate mixture when no solvent was used.

Using the above procedure the relative volatility of the pair, vinyl acetate-ethyl acetate was determined using 5% of each of the two esters and 90% solvent at 70–75° C. for phenol, ortho-cresol and meta-cresol as shown in Table I below. It should be appreciated, however, that these relative volatilities are given at low temperatures and are of value for screening only and are high for normal operations.

TABLE I

Effect of various aromatic hydroxy solvents on relative volatility of vinyl acetate-ethyl acetate

| Solvent: | Relative volatility |
|---|---|
| Phenol | 3.7 |
| o-Cresol | 2.9 |
| m-Cresol | 2.7 |

(B) A dynamic Gillespie type vapor-liquid equilibrium still was used to obtain data for calculation of the relative volatilities of the vinyl acetate-ethyl acetate-phenol system. The still consisted of a 142 ml. boiler with a stopcock in the bottom, a Cottrell pump to raise the hot liquid and vapor, a disengaging chamber to separate the liquid and vapor, a condenser and condensate trap with a stopcock for sampling, and corresponding return lines for the liquid and condensed vapor back into the bottom of the boiler. A second condenser was located over the condensate trap. A thermometer, scaled, to 0.1° C. was used to measure the temperature of the hot liquid and vapor from the Cottrell pump. The boiler, pump and thermometer housing were insulated with glass wool and aluminum foil. The condensate trap was 2.5 ml. The boiler was wound with insulated, 28-gauge Chromel A, Hi-temp appliance lead wire, Thus, special care was taken to provide enough heat at the bottom of the boiler, where the cold refluxed liquid enters, and around the stopcock.

To make a typical run, the still was partially filled with feed mixtures of known composition and heated so as to maintain a steady pumping rate of liquid and vapor through the Cottrell pump. The liquid level was adjusted so as to maintain a gentle fluctuation of the vapor condensate at the top of a capillary tubing built into the return line. Additional material was added, as needed, directly into the condensate trap. For reduced pressure experiments, extra feed material was added either through a dropping funnel at the top condenser or sucked into the vapor condensate trap through the stopcock. The latter method was preferred since a feed of high phenol content would solidify and lodge in the cold condenser. After the level was adjusted (about 5 minutes), the materials were refluxed 15 minutes, the heat was turned off, and the vapor condensate in the trap and the boiler was sampled.

Samples were analyzed by a gas-liquid chromatograph (GLC), F.&M. Scientific model 700 instrument. It was equipped with a model 240 temperature programmer and a Brown Recorder with a Disc Integrater to measure the peak areas. The column was a copper tube, 1/8" diameter by 7 feet long, with 10%, 2,6- dioctadecyl-p-cresol (EK), and 60–80 mesh Gas-Chrom Q (Product of Applied Science Lab.). For analysis the column was initially set at 40° C. to elute the vinyl and ethyl acetates, the programmed to raise the temperature 10° C. per minute and held at 125° C. to elute phenol and phenyl acetate if present. Other settings were as follows: detector and injector 210° C.; detector filament current, 225 ma., and helium at 40 ml./min. Under these conditions the following elution times were observed:

| | Min. |
|---|---|
| Acetyldehyde | 0.5 |
| Vinyl acetate | 2.4 |
| Ethyl acetate | 4.0 |
| Toluene | 9 |
| Phenol | 14 |
| Phenyl acetate | 17 |

Instrument response was determined from a series of known mixtures having a range of values with toluene as an internal standard. Factors were calculated relating detector response as recorded, and composition by weight.

Relative volatilities of the various components were calculated from the equilibrium data. Those at atmospheric pressure are listed in Table II in order of decreasing temperature. Above 140° C. the formation of phenyl acetate and acetyldehyde was noticed and analyzed quantitatively in the liquid and vapor samples. In all the runs, the mixtures were refluxed at equilibrium temperatures for 15 minutes, except for the run at 158.3° C. in which refluxing was for 60 minutes. Subscript (a) $\alpha$, 1,2 is relative volatility of vinyl acetate to ethyl acetate, $\alpha$, 1,3 is the relative volatility of vinyl acetate to phenol, and $\alpha$, 2,3 is the relative volatility of ethyl acetate to phenol; and subscript (b) indicates that the undesirable transesterification reaction was noted.

TABLE II

Relative Volatilities at Atmospheric Pressure (740-760 mm.)

| Temperature, ° C. | Liquid equilibrium concentration, wt. percent | | | Vapor equilibrium concentration, wt. percent | | | Relative volatility | | |
|---|---|---|---|---|---|---|---|---|---|
| | Vinyl acetate | Ethyl acetate | Phenol | Vinyl acetate | Ethyl acetate | Phenol | $\alpha$1,2(a) | $\alpha$1,3(a) | $\alpha$2,3(b) |
| 168.7 | 1.6 | 1.9 | 96.3(b) | 18.2 | 11.6 | 69.9(b) | 1.86 | 16.1 | 8.5 |
| 165.4 | 5.5 | .6 | 93.4(b) | 30.7 | 2.3 | 66.5(b) | 1.40 | 7.8 | 5.2 |
| 163.6 | 0 | 9.5 | 90.5 | 0 | 35.4 | 64.6 | | | 5.6 |
| 158.3 | 3.5 | 4.9 | 90.5(b) | 29.3 | 18.1 | 49.1(b) | 2.32 | 15.9 | 6.9 |
| 154.2 | 8.3 | 0 | 91.2(b) | 46.4 | 0 | 52.8(b) | | 9.7 | |
| 149.2 | 0 | 18.8 | 81.2 | 0 | 66.4 | 33.6 | | | 8.6 |
| 142.3 | 9.3 | 9.7 | 80.7(b) | 51.2 | 24.8 | 23.7(b) | 2.16 | 18.9 | 8.7 |
| 141.1 | 16.1 | 0 | 83.7(b) | 74.8 | 0 | 25.1(b) | | 15.5 | |
| 125.9 | .9 | 30.3 | 68.8 | 5.1 | 86.6 | 8.3 | 2.02 | 48.0 | 23.7 |
| 117.9 | 17.4 | 16.8 | 65.8 | 61.1 | 30.3 | 8.6 | 1.95 | 26.8 | 13.8 |
| 111.8 | 32.8 | 1.0 | 66.2 | 91.6 | .9 | 7.5 | 2.11 | 29.0 | 13.7 |
| 108.0 | 1.0 | 46.8 | 52.2 | 3.2 | 93.1 | 3.7 | 1.66 | 46.5 | 28.1 |
| 101.5 | 24.0 | 23.7 | 52.3 | 61.5 | 35.5 | 3.0 | 1.71 | 44.5 | 26.0 |
| 97.0 | 45.2 | 1.3 | 53.5 | 95.8 | 1.5 | 2.7 | 1.82 | 42.3 | 23.2 |
| 92.3 | 1.0 | 62.6 | 36.4 | 2.5 | 96.4 | 1.1 | 1.54 | 80.6 | 52.4 |
| 89.1 | 32.5 | 31.2 | 36.3 | 60.7 | 37.9 | 1.4 | 1.53 | 47.0 | 30.7 |
| 89.0 | 1.1 | 66.6 | 32.3 | 2.2 | 96.9 | .9 | 1.48 | 81.9 | 55.3 |
| 85.7 | 34.8 | 33.7 | 31.5 | 59.9 | 39.3 | .8 | 1.48 | 69.6 | 47.0 |
| 85.7 | 58.4 | 1.0 | 40.6 | 97.9 | .9 | 1.2 | 1.71 | 56.6 | 33.1 |
| 82.9 | 1.1 | 78.3 | 20.6 | 2.1 | 96.9 | 1.0 | 1.49 | 37.3 | 25.0 |
| 82.4 | 67.4 | 1.0 | 31.6 | 98.1 | .9 | 1.0 | 1.52 | 47.8 | 31.5 |
| 79.9 | 41.2 | 38.6 | 20.2 | 57.7 | 41.7 | .6 | 1.30 | 51.4 | 39.7 |
| 78.0 | 80.4 | 1.0 | 18.6 | 98.7 | 1.0 | .3 | 1.23 | 65.3 | 53.2 |
| 73.9 | 70.3 | 25.0 | 4.7 | 77.2 | 22.8 | .0 | 1.21 | | |
| 72.3 | 78.8 | 16.3 | 4.9 | 85.6 | 14.4 | .0 | 1.24 | | |

(C) The rate of phenyl acetate formation was measured by heating at total reflux a mixture of vinyl acetate, ethyl acetate and phenol of known concentration under $N_2$. Samples were removed at intervals, analyzed by GLC for phenyl acetate and second-order rate constant for its formation calculated. The results are tabulated in Table III below, giving both the percent phenyl acetate in solution after one hour and the calculated second-order rate consant as moles$^{-1}$ min.$^{-1}$ at the temperature indicated.

TABLE III

Rate of transesterification

| Composition of change in weight percent | | | Reflux temperature in ° C. | Phenyl acetate in 60 minutes, weight percent in solution | Second order rate constant in l./(moles) (min.) |
|---|---|---|---|---|---|
| Vinyl acetate | Ethyl acetate | Phenol | | | |
| 0.53 | 39.5 | 59.9 | 123 | <0.1 | .00042 |
| 0.97 | 39.2 | 59.8 | 124 | <0.1 | .00047 |
| 2.1 | 38.0 | 59.0 | 124 | <0.1 | .00017 |
| 5.0 | 35.1 | 59.9 | 121 | <0.1 | .00024 |
| 25.2 | 0 | 74.8 | 128 | 0.1 | .00012 |
| 10.2 | 0 | 90.0 | 157 | 1.37 | .0021 |
| 2.1 | 0 | 97.9 | 178 | .61 | .0032 |

EXAMPLE 2

The process of the invention is further illustrated by the description of one embodiment presented below, which is to be considered with FIG. 1, a schematic flow sheet. Acetate feed composed of about 6,300 lbs./hr. of vinyl acetate containing about 10 lbs./hr. of ethyl acetate is fed via acetate feed line 1 through heat exchanger 2 and inlet line 3 into a mid point extractive distillation tower 5. The tower having between 40–70 trays is maintained at 74° C. at the top, 99° C. at the upper section, and 127° C. at the bottom. A phenol feed made up of recycle recovered phenol via line 13 and make-up phenol via line 12 is fed through lines 6 and 4 via heat exchanger 2 into the upper portion of extractive tower 5. This phenol feed consists of about 19,000 lbs./hr. phenol containing less than 15 p.p.m. ethyl acetate. The phenol is fed into tower 5 at a level well above the acetate feed tray.

An overhead stream is removed from tower 5 via line 7 and is passed into condenser 8. The resulting condensate is passed via line 9 and thence either as reflux via line 10 back into the top of extractive ditsillation tower 5 or as vinyl acetate product via line 11. This vinyl acetate product stream consists of about 6,300 lbs./hr. of purified vinyl acetate containing 10 p.p.m. ethyl acetate and 10 p.p.m. phenol. A bottom stream is removed from tower 5 via line 14, through pump 15, and a part is passed via lines 16 and 17, reboiler 18, and line 19 into the lower portion of tower 5 as a recycle stream to reduce temperatures in the lower portions of the tower and control the concentration of acetates in the bottom stream. The remainder of the bottoms stream consisting of about 60 lbs./hr., vinyl acetate, about 16,000 lbs./hr. ethyl acetate and about 19,000 lbs./hr. phenol is passed via line 20 into the mid point of phenol recovery tower 21 having about 20 to 30 trays. This tower is maintained at 77° C. at the top, 88° C. at the upper portion, 127° C. at the mid portion and 127° C. at the bottom. A top stream is removed via line 22 and passed into condenser 23. The condensate from condenser 23 is passed via line 24 and thence either by line 25 as reflux into the upper portion of tower 21 or as a phenol-acetates discharge stream via line 26, containing about 5 lbs./hr. vinyl acetate, about 10 lbs./hr. ethyl acetate, and 0.4 lbs./hr. phenol. From the bottom of tower 21, via line 27, a bottom stream is removed to pump 28 and a part is passed through line 29, reboiler 30 and line 31 back to the lower portion or tower 21. The remainder is passed by lines 13, and 6 through heat exchanger 2 and phenol feed line 4 as recycle phenol back to tower 5. A vapor recycle stream containing about 63 lbs./hr. vinyl acetate, about 16,000 lbs./hr. ethyl acetate, and about 4,770 lbs./hr. phenol is removed from an upper section of tower 21 and passed via line 32 into the lower portion of tower 5.

While particular embodiments of this invention are shown above, it will be understood that the invention is obviously subject to variation and modifications without departing from its broader aspects.

What is claimed is:

1. A process for the purification of vinyl acetate containing minor amounts of ethyl acetate which comprises effecting an extractive distillation by introducing said vinyl acetate into an intermediate point of a distillation column, introducing from about 20% to 98% by weight, based on the weight of the vinyl acetate, of an aromatic hydroxy compound into said column at a point above said inlet point for vinyl acetate, wherein said amount is sufficient to alter the relative volatility of vinyl acetate to ethyl acetate to at least about 1.5, removing a vinyl acetate stream having not more than about 100 p.p.m. of ethyl acetate from an upper portion of the column and an ethyl acetate-containing aromatic hydroxy compound stream from the lower portion of the column, and maintaining a distillation temperature of less than about 160° C. at the bottom of said column.

2. The process of claim 1 wherein the aromatic hydroxy compound is phenol.

3. The process of claim 1 wherein the aromatic hydroxy compound is o-cresol.

4. The process of claim 1 wherein the aromatic hydroxy compound is m-cresol.

5. The process of claim 1 wherein the aromatic hydroxy compound is a mixture of cresols.

6. The process of claim 1 wherein the aromatic hydroxy compound is a mixture of phenol and cresols.

7. The process of claim 1 wherein the aromatic hydroxy compound is used in an amount of from about 30% to 80% by weight.

8. The process of claim 1 in which at least a part of said ethyl acetate containing aromatic hydroxy compound stream removed from the lower portion of the column is recycled to the lower portion of the column.

9. The process of claim 8 wherein the aromatic hydroxy compound is phenol.

10. The process of claim 1 in which the distillation column used is maintained under reduced pressure.

References Cited
UNITED STATES PATENTS

| | | | |
|---|---|---|---|
| 2,171,795 | 9/1939 | Kautter | 203—65 |
| 2,380,723 | 7/1945 | Cunningham | 203—65 |
| 3,444,189 | 5/1969 | Olivier | 260—497 A |

WILBUR L. BASCOMB, Jr., Primary Examiner

U.S. Cl. X.R.

203—84, 98; 260—497 A, 499 R